United States Patent
Cappelletti et al.

(10) Patent No.: US 11,329,480 B1
(45) Date of Patent: May 10, 2022

(54) SERIES STATIC SPARK GAP FOR EMP PROTECTION

(71) Applicant: Advanced Fusion Systems LLC, Newtown, CT (US)

(72) Inventors: John Cappelletti, Charlotte, NC (US); Gediminas Campe, Newtown, CT (US); Curtis Birnbach, New Rochelle, NY (US)

(73) Assignee: Advanced Fusion Systems LLC, Newtown, CT (US)

( * ) Notice: Subject to any disclaimer, the term of this patent is extended or adjusted under 35 U.S.C. 154(b) by 0 days.

(21) Appl. No.: 17/193,643

(22) Filed: Mar. 5, 2021

(51) Int. Cl.
 *H02H 1/00* (2006.01)
 *H02H 7/26* (2006.01)
 *H01T 14/00* (2006.01)
 *H01T 1/00* (2006.01)

(52) U.S. Cl.
 CPC ............. *H02H 7/26* (2013.01); *H01T 1/00* (2013.01); *H01T 14/00* (2013.01); *H02H 1/0007* (2013.01)

(58) Field of Classification Search
 CPC ......... H01T 13/41; H01T 13/40; H01T 13/34; H01T 13/16; H01T 13/22; H01T 13/32; H01T 13/38; H01T 13/467; H01T 13/39; H01T 13/08; H01T 13/50; H01T 13/52; H01T 21/02; H01T 1/22; H01T 1/20; H01T 1/14; H01T 1/12; H01T 1/15; H01T 2/02; H01T 4/12; H01T 4/04; H01T 4/08; H01T 4/06; H01T 19/00; H01T 23/00
 See application file for complete search history.

(56) References Cited

U.S. PATENT DOCUMENTS

| | | | | |
|---|---|---|---|---|
| 2,708,686 A | * | 5/1955 | Bernard, Jr. | H01P 1/00 174/41 |
| 5,225,743 A | * | 7/1993 | Codina | H01T 2/02 313/589 |
| 2008/0094772 A1 | * | 4/2008 | Hino | H01T 4/16 361/130 |
| 2009/0102377 A1 | * | 4/2009 | Schleimann-Jensen | H01T 4/12 313/567 |
| 2010/0097734 A1 | * | 4/2010 | Birnbach | H01H 83/10 361/54 |
| 2013/0278129 A1 | * | 10/2013 | Krauss | H01T 4/16 313/10 |
| 2014/0132157 A1 | * | 5/2014 | Ehrhardt | H01T 4/16 315/127 |
| 2015/0288176 A1 | * | 10/2015 | Durth | H02H 9/06 361/91.2 |

* cited by examiner

*Primary Examiner* — Bryan R Perez
(74) *Attorney, Agent, or Firm* — Leason Ellis LLP

(57) ABSTRACT

A method for protecting an electrical transmission system having an electrical transmission line coupled to electrical equipment from hazardous EMI comprises receiving at least one pulse of hazardous EMI on the transmission line, and shunting current induced on the electrical transmission line by the at least one pulse of hazardous EMI to ground through at least one static series spark gap apparatus in such manner as to bypass high speed transient voltages from the electrical equipment to ground via a low impedance means and prevent damage thereto, wherein the static series spark gap apparatus has a rise time that is typically 2 nanoseconds or less.

16 Claims, 13 Drawing Sheets

FIG. 8A
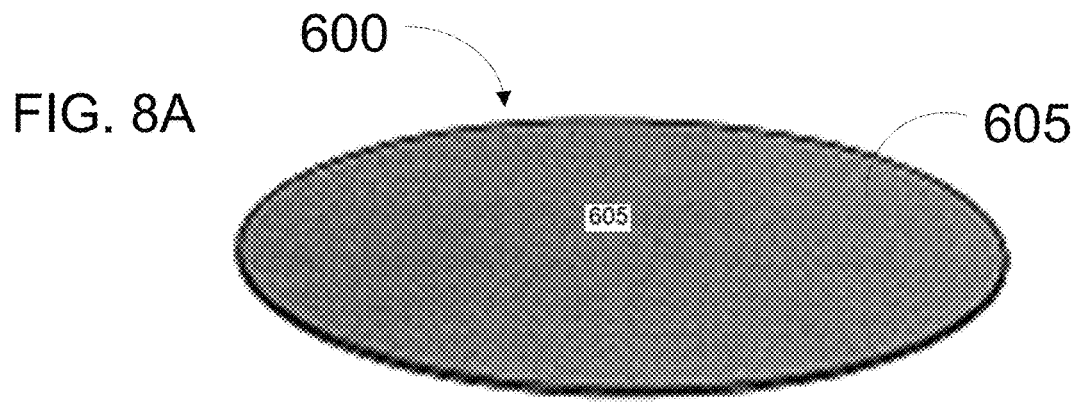
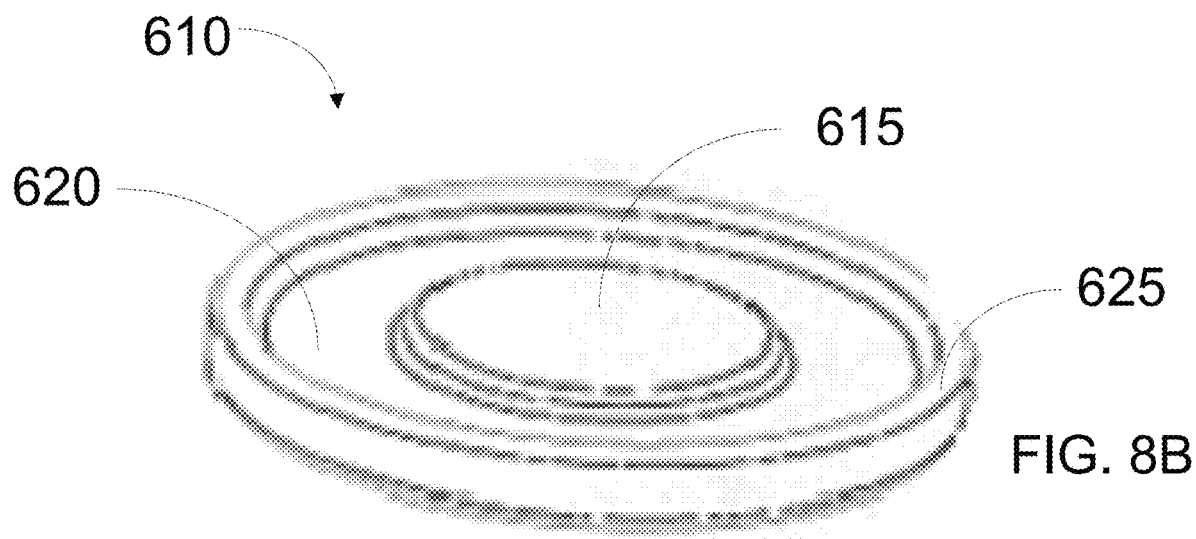
FIG. 8B
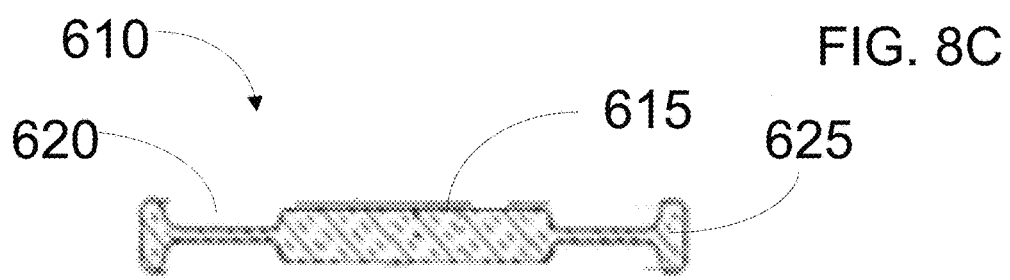
FIG. 8C

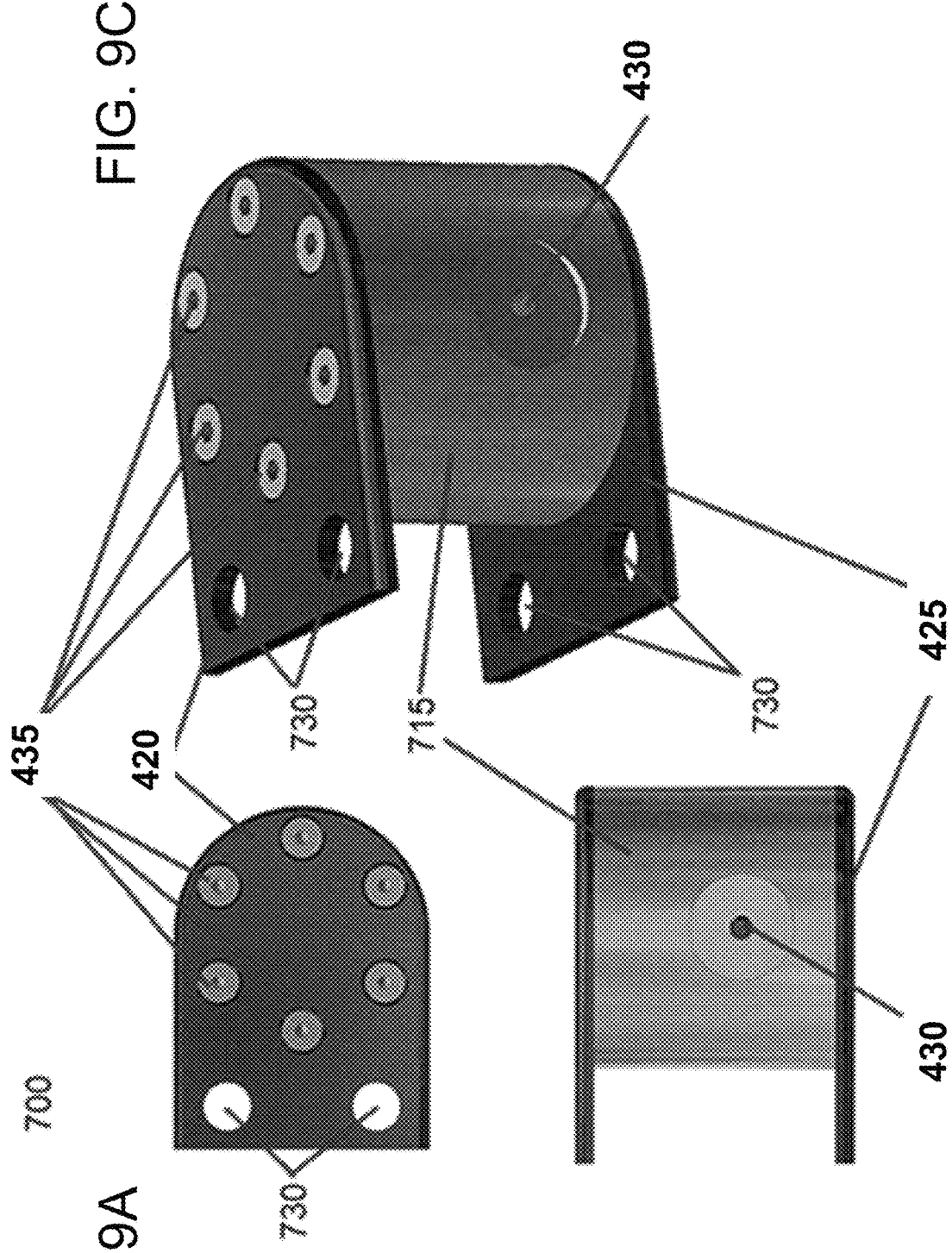

SERIES STATIC SPARK GAP FOR EMP PROTECTION

FIELD OF THE INVENTION

Presented herein is a description of a method and apparatus specifically for the application of a Series Static Spark Gap (S3G) for use in protection of electric power generation systems, transmission, distribution, and other related equipment from damage due to Electromagnetic Pulse (EMP) arising from nuclear and non-nuclear events.

Definitions

Electromagnetic Interference (EMI): Electromagnetic radiation, the reception of which is undesired in an electrical system as it can interfere with conveyed signals or equipment coupled to such system. EMI is defined herein as a broad term that encompasses numerous sub-types that are defined herein below.

Hazardous EMI: Electromagnetic interference, the receipt of which in an electrical system has a high likelihood of damaging or rendering inoperable electric equipment coupled to such system, such as, but not limited to, electrical generating equipment, electronic circuit boards and transformers. This interference may be a pulse or continuous emission.

Intentional electromagnetic interference (IEMI): electromagnetic interference intentionally (artificially) created to negatively affect a targeted electrical system. This interference may be a pulse or continuous emission.

Electromagnetic Pulse (EMP): A transient burst of electromagnetic radiation having a fast rise time of typically less than 5 nanoseconds that is hazardous and can produce potentially damaging current and voltage surges (and can thus be considered a subset of hazardous EMI). Typical EMP intensity is in the order of tens of thousands of volts/meter. EMP can be produced by a nuclear detonation (NEMP; risetime typically is less than 5 nanoseconds) or by non-nuclear sources that produce a suddenly fluctuating electromagnetic field such as lightning and coronal mass ejections (NNEMP; risetime typically is less than 5 nanoseconds).

Wavespring: A type of spring, made either by edge coiling of a hardened spring wire or with a flat washer, which are then pressed to impose a wave-like structure on the spring. The advantages of this are reduced height, and, in the case of the washer variant, improved surface contact.

It is noted that NEMP, HEMP, SREMP, SGEMP, and others are all types of electromagnetic pulses derived from the explosion of a nuclear device (fission, fusion, thermonuclear fusion) All are typified by extremely fast risetimes, typically less than 5 nanoseconds, and which can have risetimes in the sub-nanosecond range. All these EMP types, as well as the Non-Nuclear EMP class (NNEMP), produce pulses that are typified by an extremely broad RF Bandwidth, typically ranging from a few KiloHertz to several GigaHertz. It is further noted that the signal level at any individual frequency across this portion of the spectrum is not uniform, but the bulk of the energy is located below around 200 MegaHertz. These boundaries are not fixed and are determined by a number of parameters that exist at the moment of the creation of said pulse.

BACKGROUND OF THE INVENTION

Electromagnetic Pulses

It is well known the certain events can produce electromagnetic radiation that can be extremely destructive to electrical infrastructure. The term used herein for this broad category of electromagnetic radiation is "hazardous electromagnetic interference (EMI)." In light of concerns regarding the spread of nuclear weapons and similarly destructive technology, research has been conducted to study the effects of the powerful burst of hazardous EMI emitted by nuclear detonations (NEMI). Research has shown that nuclear detonations generate bursts of electromagnetic pulses (EMP) with extremely fast rise-times (on the order of less than 2 nanoseconds), followed by slower, longer-lasting portions of the signals. Typical EMP intensity is in the order of tens of thousands of volts/meter. This compares with the order of 200 volts/meter for nearby radars, 10 volts/meter for communication equipment, and 0.01 volts/meter for typical metropolitan area ambient. Some of the characteristics of EMP which result in a threat to electrical equipment are extremely fast risetime, extremely short pulse width, and electric field amplitude which gives rise to a signal with broad frequency spectrum.

There are three basic mechanisms for electromagnetic coupling to a conducting structure: electrical induction, the basic mechanism for linear conductors; magnetic induction, the principal mechanism when the conducting structure forms a closed loop circuit; and signal transfer through the earth. Devices which may be susceptible to functional damage due to electrical transients include active electronic devices, passive electronic components, semiconductor devices, squibs and pyrotechnic devices, meters, and power systems, cables, switching and distribution elements. Operational upset and damage can be expected in digital processing systems, memory units, guidance systems, and power distribution systems. Damage mechanisms include dielectric breakdown, thermal effects, crosstalk, interconnection, switching, transformer, and generator failures.

It should be noted that the majority of EMP attack scenarios may involve more than a single pulse being used in said attack. The consequence of this is that in order for a protective scheme to be viable, it must be able to withstand multiple electromagnetic attacks, possibly in close succession in order for such a protective scheme to be considered as a viable means of protection. Some protective schemes are single shot or potentially single shot and thus are not truly suitable for protection service, in spite of their current widespread use. The present invention provides a method of responding to a multiple pulse attack.

EMP Versus Lightning

As mentioned above, the apparatus and methods disclosed herein protect against hazardous EMI including fast risetime electromagnetic pulses (EMP) as well as relatively slower lightning strikes. For example, EMP arising from endo-atmospheric denotations (SREMP) have a rapid rise time (typically sub-nanosecond) and short pulse duration (typically 500 nanoseconds or less). This EMP has a substantial electrical field strength that is typically within, but not limited to, the range of 10 KV/meter to 500 KV/meter. Electrical pulses in power lines generated by lightning behave in a similar fashion to EMP pulses, but can have a slower risetime, typically around 20 nanoseconds, and a longer pulsewidth than nuclear, or other artificially created EMP. or longer-pulse EMP (e.g., lightning) depending upon which type of EMP is deemed to be the more important threat at a particular power line.

Prior Art: Spark Gaps

A Spark Gap is a form of a fast switch which is sometimes used for hazardous EMI protection. A spark gap is wired to shunt the overvoltage around sensitive components. A problem with conventional spark gaps is getting them to trigger reliably at some predetermined voltage. A further problem is that once fired, the contact surfaces of the spark gap degrade, and subsequent firing events are usually not at the same voltage as when the spark gap is new. Spark gaps require very high maintenance and their use is generally restricted to laboratory pulse power experimentation. Another form of spark gap that is used exclusively by the electric power distribution and transmission industry is a set of curved rods, often referred to as "horns." (See FIG. 4B) While too slow in risetime for protection against fast-rise time EMP, horns have been shown to be a simple approach for lightning protection and are widely used.

Spark gaps operate, generally, on the principle of having two or more electrodes, spaced a distance apart, such that said distance is more than the distance required for an arc to form spontaneously at the normal operating voltage of the device. The spark gap has a long and storied history, dating back to the late 1800's. Nikola Tesla patented a spark gap design in 1894 (U.S. Pat. No. 514,168 Means for Generating Electric Currents—6 Feb. 1894 Nikola Tesla; see FIG. 5) which disclosed a spark gap system with multiple gaps in series. While this was not the first spark gap design, it does represent a more sophisticated thinking than single gap designs such as that disclosed by Boas (Boas U.S. Pat. No. 1,152,272 31 Aug. 1915; see FIG. 4A). But whether single or multiple gaps are employed, all spark gaps are governed by Paschen's Law (see FIG. 1).

Prior art spark gaps come in many designs. Some include the single arc gap (FIG. 4A), the Horn Gap (FIG. 4B), and the series static spark gap. Spark gap operation is governed by Paschen's law, as previously described which sets the variables of gap design into a cohesive mathematical structure from which gaps can be reliably designed. One issue a designer must contend with is quenching, (the extinguishing of the arc). While many schemes for extinguishing the arc have been put forth, a self-extinguishing design is the most practical for fast risetime operation, necessary consideration for suppression of EMP and similar transients. FIGS. 5A and 5B illustrate a 3 stage Series Static Spark Gap (S3G) of early design. This particular design cannot achieve the required risetime due to its physical geometry which has a high self-inductance.

Paschen's Law is an equation (Equation 1; FIG. 1) that gives the breakdown voltage, that is, the voltage necessary to start a discharge or electric arc, between two electrodes in a gas as a function of pressure, electrode geometry, and gap length. It is named after Friedrich Paschen who discovered it empirically in 1889. Paschen studied the breakdown voltage of various gases between parallel metal plates as the specific gas, gas pressure, and gap distance are varied. The curve of voltage versus the pressure-gap length product for several commonly used gasses is shown in FIG. 1 is called Paschen's curve. The breakdown behavior of a gas according to Paschen's Law is characterized by the following:

With a constant gap length, the voltage necessary to arc across the gap decreases as the pressure is reduced and then increases gradually, exceeding its original value.

With a constant pressure, the voltage needed to cause an arc reduces with reduction of gap size up to a limit. As the gap was reduced further beyond the lower limit, the voltage required to cause an arc begins to rise and again ultimately to exceed its original value.

According to Paschen's law, for a given gas, the voltage is a function only of the product of the pressure and gap length. Paschen found that breakdown voltage was described by the equation (Eq. 1):

$$V_B = \frac{Bpd}{\ln(Apd) - \ln\left[\ln\left(1 + \frac{1}{\gamma}\right)\right]} \quad (1)$$

In the equation, $V_B$ is the breakdown voltage in volts, p is the pressure in pascals, d is the gap distance in meters, $\gamma_{se}$ is the secondary-electron-emission coefficient (the number of secondary electrons produced per incident positive ion), A is the saturation ionization in the gas at a particular E/p (electric field/pressure), and B is related to the excitation and ionization energies. The constants A and B are determined experimentally and found to be roughly constant over a restricted range of E/p for any given gas.

It is worth noting that the single spark gap plays an important role in the lives of most people. It is found in the core of the gasoline powered internal combustion engine and is generally referred to as a "Spark Plug". This ubiquitous device is basically responsible for a significant portion of all modern transportation systems.

The Series Static Spark Gap

When two or more gaps are wired in series, they are known as "Series Static Spark Gaps" (referred to as "S3G") (See FIGS. 5A, 5B). "Static" in this use refers to the fact that the arc in the gap is not actively extinguished as is the case with modern large spark gaps found, for example, in electrical sub-stations. In the Series Static Spark Gap, the plasma is formed in several locations, and the voltage at each gap is lowered as more electrodes are placed in series. Heat, hot ions, and voltage are distributed. Distributing the arc over several gaps in series has several benefits. First, the dielectric strength of a given total width of air space is greater when a great many small air gaps are used instead of one, which permits working with a smaller length of air gap. With smaller air gaps there is smaller loss and less deterioration of the metal. Secondly, by reason of splitting the arc up into smaller arcs, the polished surfaces are made to last much longer. Thirdly, the apparatus affords some gauge in the experiments. It is noted that the sum of the distributed gap spacing dimensions should be equal to the single gap spacing dimension as determined by the use of Paschen's equation (Equation 1). FIGS. 5A and 5B illustrate a 3 stage Series Static Spark Gap (S3G) of early design. This particular design cannot achieve the required risetime due to its physical geometry which has a high self-inductance.

In sum, the principal advantages of this type of spark gap are:

1. Less energy lost in the arcs
2. Longer electrode life
3. Offers a way to measure voltage through the gap
4. Smaller arcs are less noisy than larger arcs.

It is noted that too many gaps in series lowers the risetime of the spark gap due to increased parasitic inductance in the structure. Adding gaps in parallel and reducing the number of gaps in series might seem to offer a solution, but the parasitic inductance of this topology is self-limiting due to increased inductance of the larger structure.

It is further noted that one of the major advantages of the S3G is that the electrical load is distributed across the total number of spark gap elements contained in the series string. This greatly reduces the arc-induced damage to the electrode surfaces. It is not, however, a panacea for this problem. Arc streamers (the precursor to a full-blown arc) will always form at the point where the gap surfaces are closest together, even if this distance is a ten thousandth of an inch or less, due to the very small size of an electron as compared to any deviation in gap size (gap error).

In addition, the distributed gap structure of an S3G acts as a type of voltage divider. However, it is not a very good voltage divider for fast pulses. The voltage division between the individual spark gaps of a S3G can be thought of as being analogous to a capacitive voltage divider, as each gap element has a small but measurable capacitance, typically in the low picoFarad range. FIGS. 5A and 5B show front and top plan views of a conventional S3G apparatus. In a S3G such as is shown in FIGS. 5A and 5B, the voltage builds up across the gap closest to the voltage source before it then starts building up across subsequent gaps. This can cause excessive wear in the first gap element. In a spark gap, the consequence of this excessive wear is that the gap no longer fires at within the desired voltage range. Depending on the type of erosion, the firing voltage can either be lower if there is a build-up of a crater wall around an arc pit, leading to a reduced gap dimension at a point, or higher if the electrode is worn away and the gap dimension is increased. This type of uncertainty is a serious problem where the entire S3G structure needs to fire at a-predetermined voltage, as is the case in EMP protection, where it needs to fire at a voltage above the BIL (Basic Impulse Level) test voltage but below the actual voltage at which damage occurs from EMP.

Other prior art designs show different modifications to the basic themes as described originally by Tesla and Boas. None of the prior art designs has been developed for the express purpose of protection of electrical equipment from the very fast transient pulses that are typically associated with EMP. Therefore, a need remains for a method and device that can reliably and efficiently overcome the foregoing deficiencies and protect electrical and electronic systems from hazardous EMI and specifically EMP, whether produced by nuclear explosion of artificial electrical means.

SUMMARY OF THE INVENTION

Embodiments of the current invention provide a method of limiting high speed transient voltages to a safe level from electrical power, transmission and distribution systems as a means of protection from hazardous electromagnetic interference of various types, including but not limited to Electromagnetic Pulse (EMP) produced by nuclear explosions and by artificial means by utilization of a Series Static Spark Gap (S3G) wired between a phase of an electrical power line and ground. One or more of such devices are employed depending on the number of phases in the designated electrical system. The S3G must have a rise time that is faster than the risetime of the class of pulses being protected against. The rise time is typically around 2 nanoseconds but can be less.

These and other features can be appreciated from the accompanying description of certain embodiments of the invention which are discussed in relation to the accompanying drawing figures.

BRIEF DESCRIPTION OF THE DRAWINGS

FIG. 1A shows this transmission system in its normal operating state. FIG. 1B shows an EMP pulse impinging on the transmission line and the induced voltage and current in the transmission line as a result.

FIG. 7A shows a perspective cutaway view of an embodiment an electrode that can be employed in the apparatus and methods of the present invention.

FIG. 7B shows a cross-sectional view of the embodiment of an improved electrode.

FIG. 7C shows a cross-section of the improved electrode of FIG. 7B.

FIG. 8A shows a perspective view of an embodiment of an insulator plate that can be used in the apparatus and methods of the present invention.

FIG. 8B shows a perspective view of the embodiment of the insulator disk associated with the electrode shown in FIGS. 7B and 7C.

FIG. 8C is a cross sectional view of the improved insulator. Note that in FIG. 8, all cases of insulator are smaller in diameter than the associated electrodes shown in FIG. 7.

FIG. 9A shows a top view of an embodiment of Series Static Spark Gap incorporating a NEMA 2 (National Electrical Manufacturers Association; 2-hole connection standard) Package according to the present invention.

FIG. 9B shows a side view of the embodiment of the apparatus shown in FIG. 9A.

FIG. 9C shows a perspective view of the embodiment of the apparatus shown in FIGS. 9A and 9B. A gas port is visible on the side of the insulator body.

DETAILED DESCRIPTION OF CERTAIN EMBODIMENTS OF THE INVENTION

Disclosed herein is a method and device that suppresses hazardous EMI, such as electromagnetic pulses (EMP in its varying forms) produced by nuclear detonations, lightning, and artificial electronic means, utilizing a Series Static Spark Gap (S3G) of unique design. In a first aspect, a method of protecting electrical power transmission systems from hazardous EMI is disclosed. This is accomplished by a novel application of spark gap technology. A series static spark gap is coupled to the electrical power transmission system in a shunt arrangement (typically line to ground). In this arrangement, the series static spark gap, due to its ability to react sufficiently quickly to pulses with extremely fast rise times, is able to shunt high speed transient voltages induced by an electromagnetic pulse through a low impedance path to ground. The transient voltage will always take the lowest impedance path to ground which is how the power system components are protected, due to their substantially higher impedance compared to the S3G low impedance ground path. In another aspect of the present invention, a series spark gap apparatus is specifically adapted for this particular purpose.

Figure 2A:
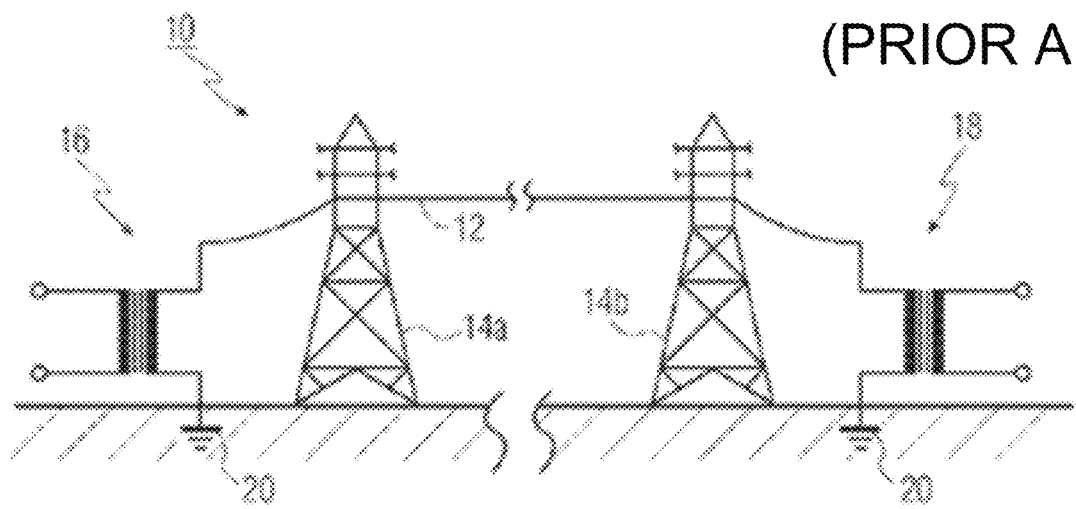
FIGS. 2A and 2B show a generic electrical power transmission system having a transmission line under normal conditions and when exposed to EMP.
Figure 2B:
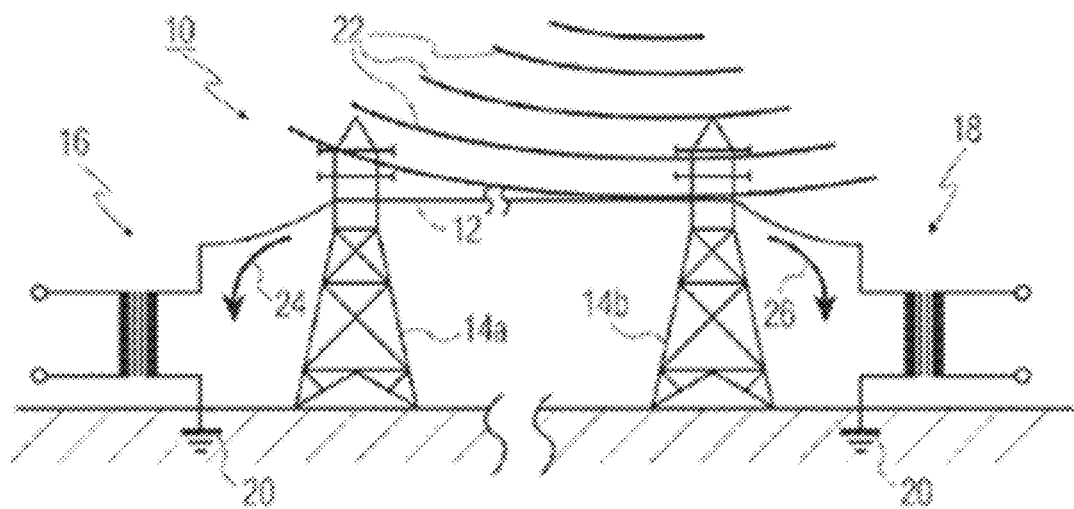
Figure 3:
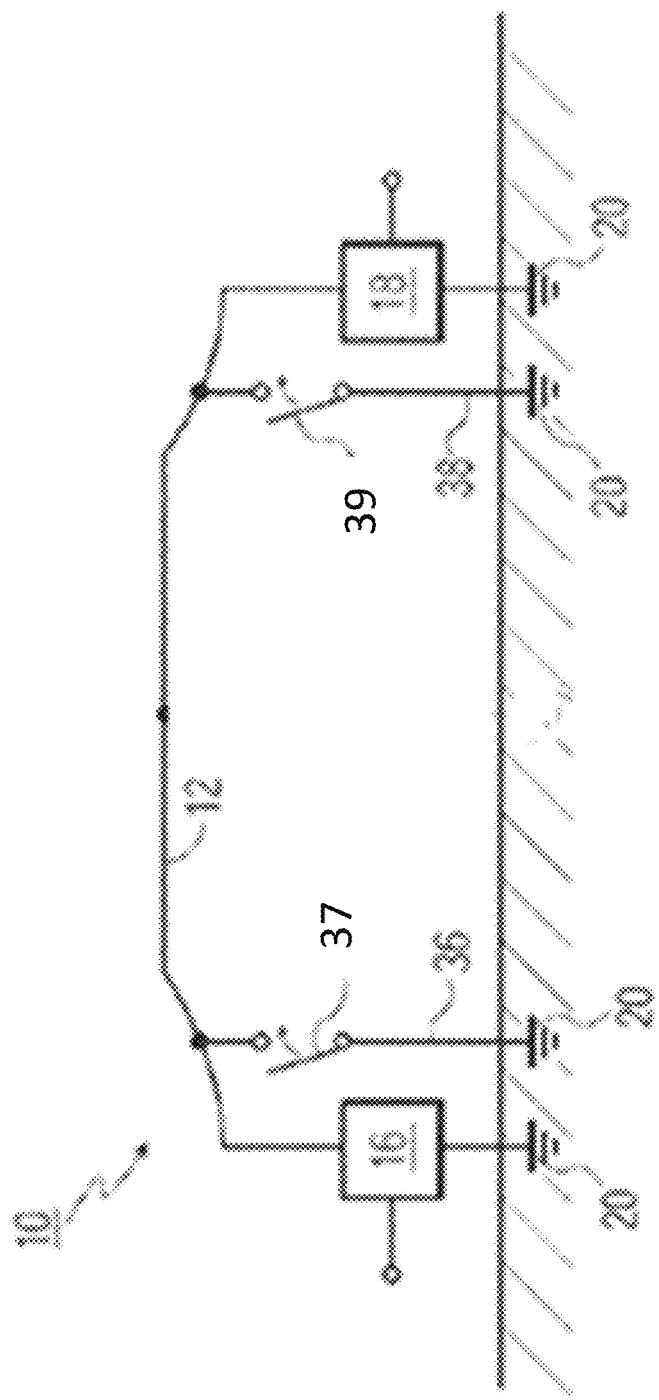
FIG. 3 shows a schematic representation of the example transmission system shown in FIGS. 2A and 2B. Element 37 is a spark gap type protective device for fast transients.

Suppression of hazardous EMI, such as electromagnetic pulses (EMP in its varying forms) produced by nuclear detonations, lightning, and artificial electronic means has become an important tool for protection of critical electric power generation, transmission and distribution infrastructure. FIG. 2A schematically illustrates a typical electric power transmission system (10). The electrical power transmission system (10) consists of large transformers (16, 18), support towers (14), and the transmission line itself (12). The transmission line usually contains a plurality of conductors as determined by whether the system is for transmission of AC or DC, and the number of conductors being determined by the number of phases and current ratings involved. As shown in FIG. 2B, when an EMP (22) from any source impinges on said transmission line, circulating voltages and currents (24, 26) are formed. The circulating voltages have very fast risetimes which can be capable of damaging various components of the electrical power transmission system. The most common protection scheme is shown schematically in FIG. 3. Systems of this type employ fast electrical switching means (37a, 39a) typically with risetimes less than 5 nanoseconds. Many different means have been tried to provide reliable high speed high voltage switching for this application, including but not limited to Metal Oxide Varistors (MOV's), Electron Tube Devices, and Spark Gaps. Prior art spark gaps have proven unsatisfactory due to various issues such as excessive self-inductance, and usable operational lifetime. The lifetime is a problem because sometimes lightning can activate these devices.

Figure 4A:
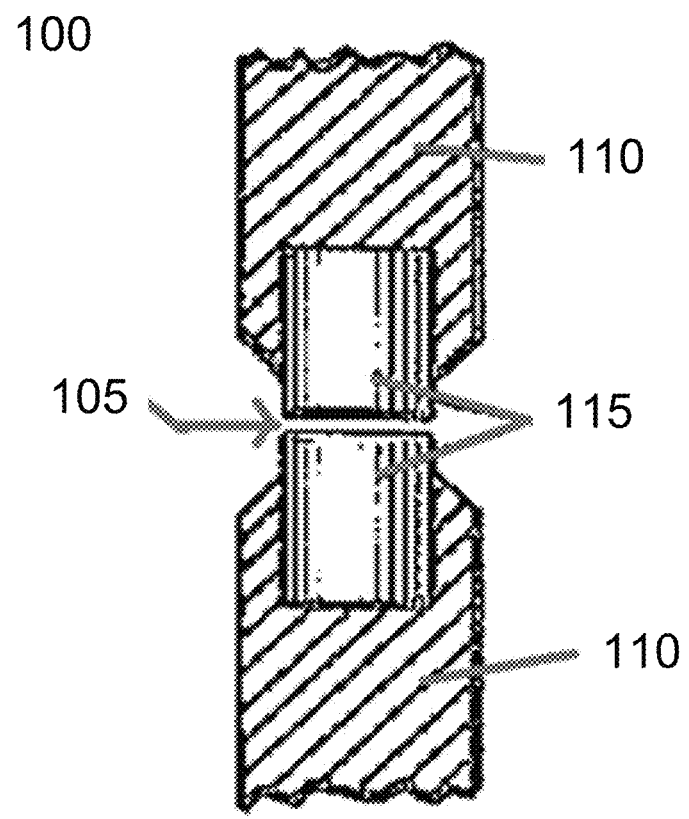
FIG. 4A shows a single spark gap according to the prior art.
Figure 4B:
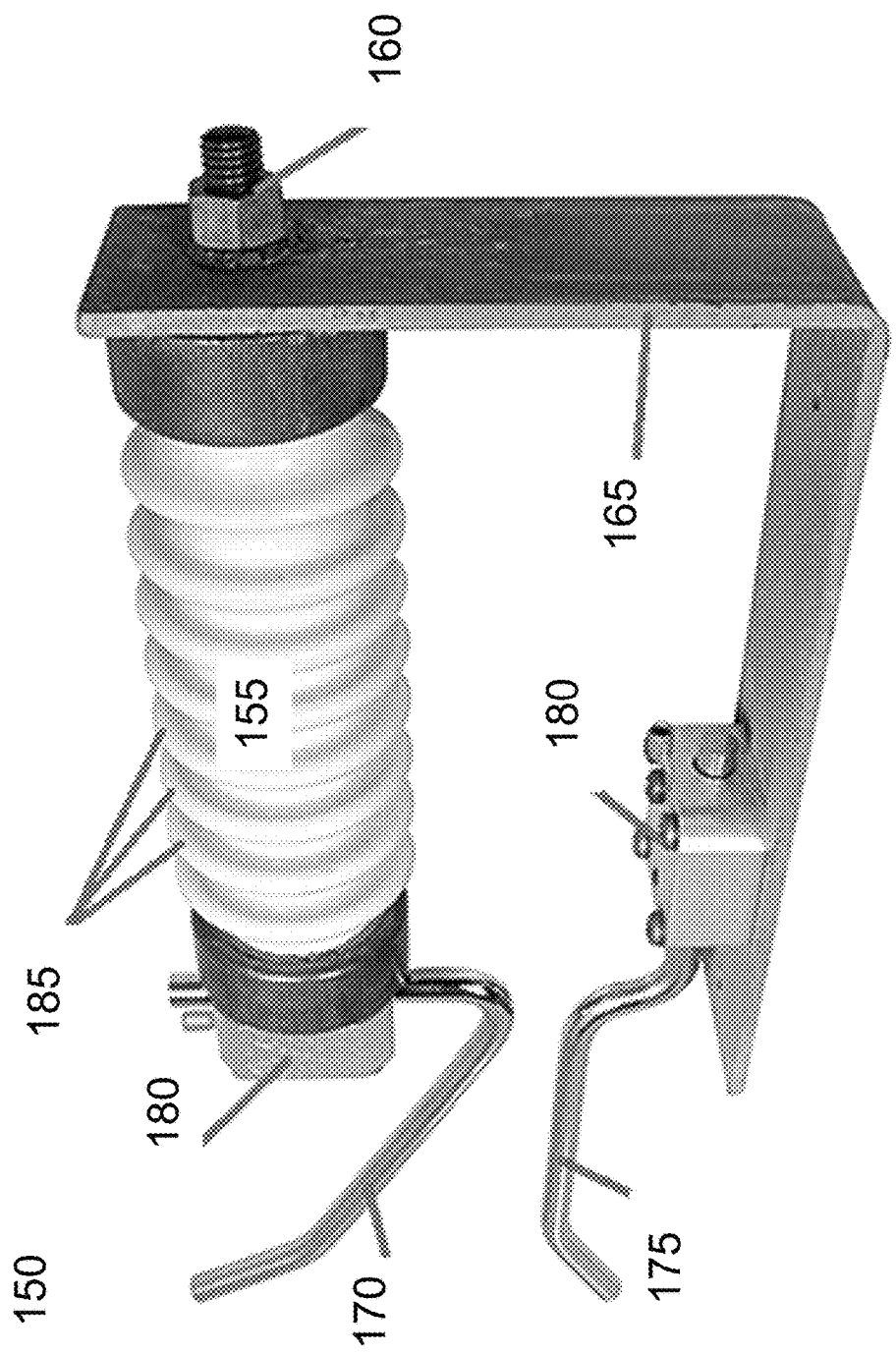
FIG. 4B shows another embodiment of a single spark gap according to the prior art known as a horn gap. It is typically used for lightning protection but it is not fast enough for transient protection against EMP.
Figure 5A:
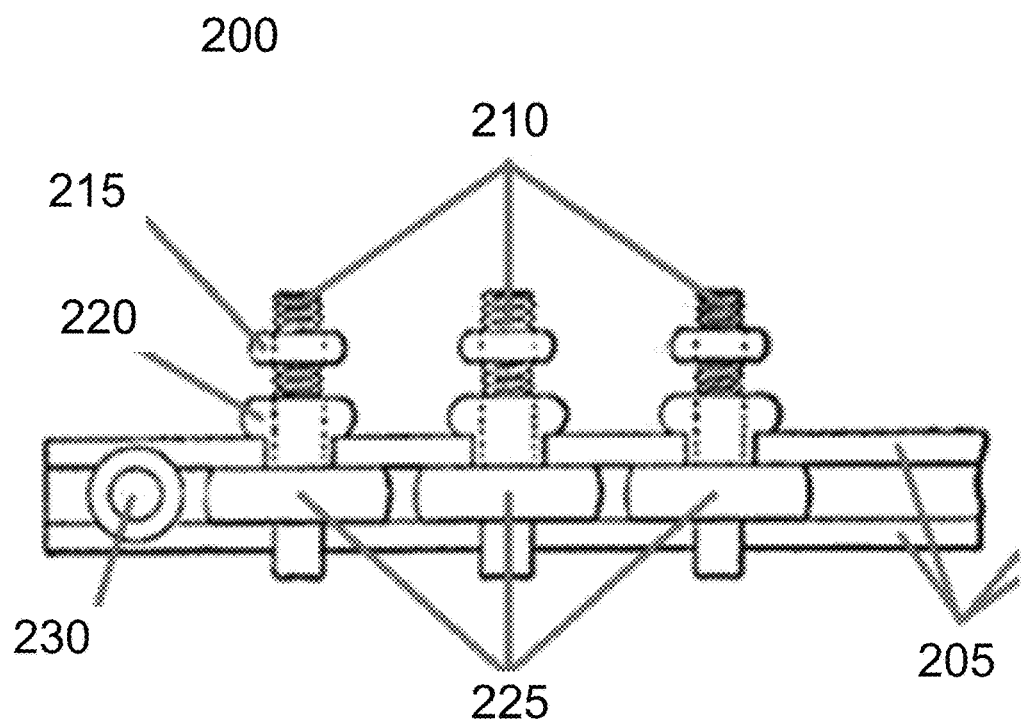
FIGS. 5A and 5B show frontal and plan views of a Series Static Spark Gap according to the prior art.
Figure 5B:
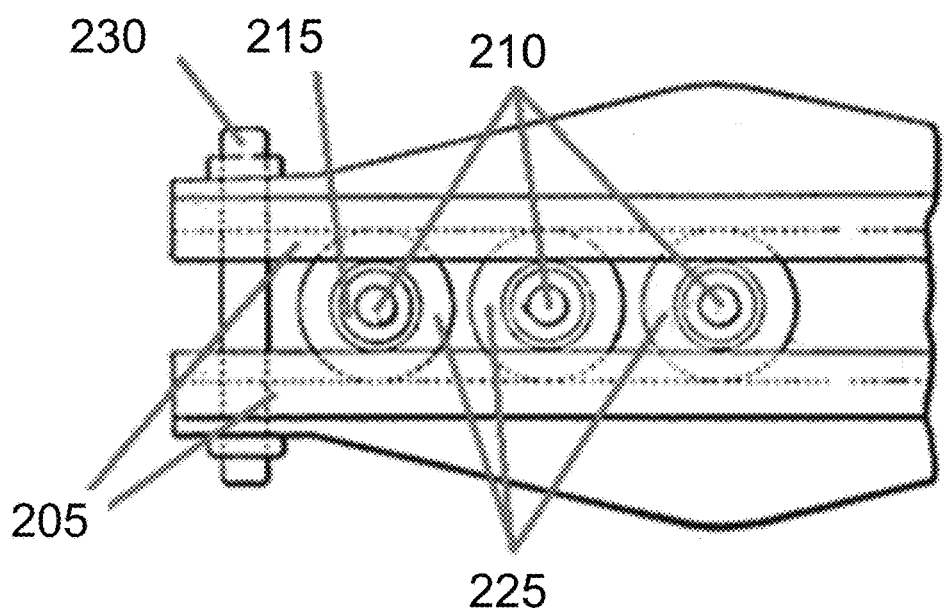
Figure 6:
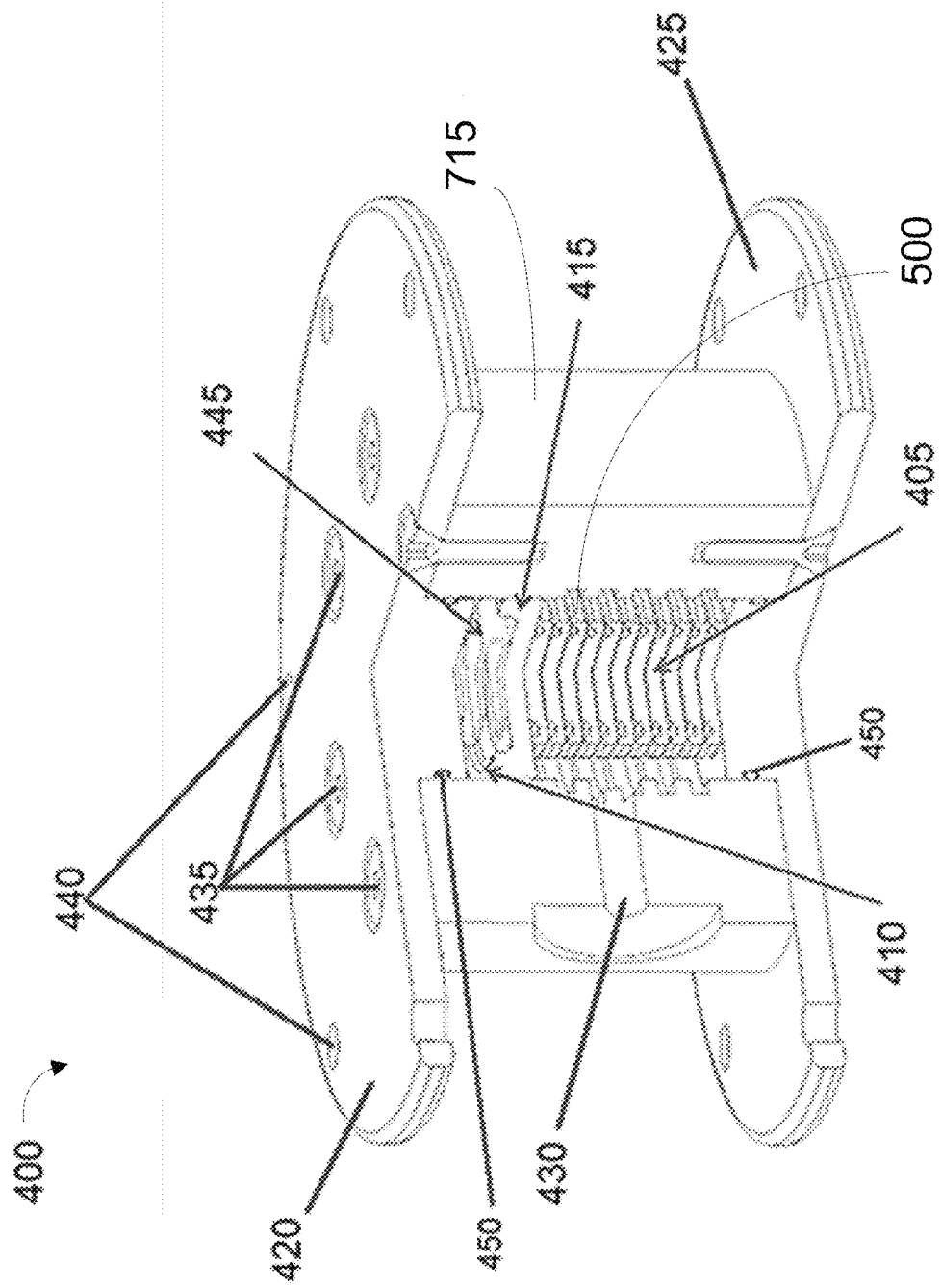
FIG. 6 shows a perspective cutaway view of an embodiment of an improved series spark gap according to the present invention.

Prior art spark gaps come in many designs. Some include the single arc gap (FIG. 5), the Horn Gap (FIG. 4B), and the series static spark gap (FIG. 4 A&B). Spark gap operation is governed by Paschen's law, as previously described which sets the variables of gap design into a cohesive mathematical structure from which gaps can be reliably designed. One issue a designer must contend with is extinguishing the arc. While many schemes for extinguishing the arc have been put forth, a self-extinguishing design is the most practical for fast risetime operation, a necessary consideration for suppression of EMP and similar transients. FIGS. 4A shows an early single gap spark gap, and 4B shows a 3 stage Series Static Spark Gap (S3G) of early design. This particular design cannot achieve the required risetime due to its physical geometry which has a high self-inductance.

A preferred embodiment of said switching means (and components thereof), referred as a series static spark gap (S3G) apparatus, is shown in FIGS. 6 through 9A-C. The S3G (400) of the present invention includes a stack (405) consisting of alternating electrodes (shown individually in FIGS. 7A-7C) and insulator disks (shown in FIGS. 8A-8C) arranged in a carefully aligned structure. The spacing between the electrode elements is determined according to equation (1) above based on voltage and other relevant terms as would be understood to those of skill in the art. It is noted that in the stack of alternating electrodes and insulators, that, in addition to the calculation of Equation 1, it is further necessary to divide the gap dimension (d) by the number of gaps (n) between the electrodes to get the correct gap dimension for each gap in the stack.

Figures 7A, 7B, 7C:
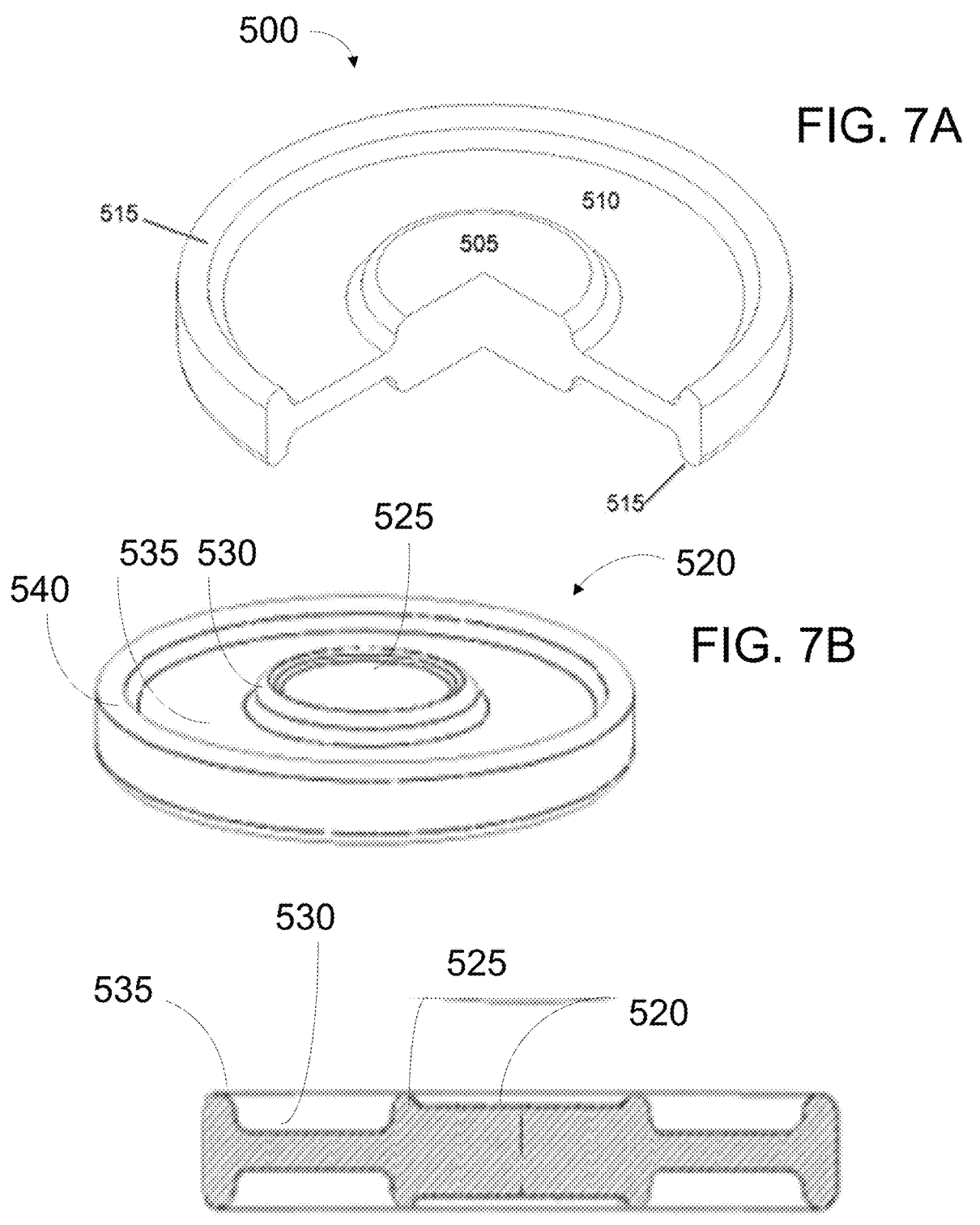

FIG. 7A is a cut away view of a first embodiment of an electrode that can be used in the stack of the S3G apparatus according to the present invention. As shown, the electrode (500) comprises a central hub (505) with a depressed surrounding area (510) and a radiused contact area (515). FIGS. 7B and 7C depict a perspective view and a cross-sectional view of a preferred embodiment of an electrode that is a variation of the embodiment shown in FIG. 7A. The preferred electrode (520) has a central hub (525) but, unlike the embodiment of FIG. 7A, there is a raised ridge (530) around the circumference of the central hub. A depressed area (535) surrounding the central hub (and ridge) and at the periphery of the electrode is a radiused contact area (540).

FIG. 8A depicts a first embodiment of an insulator disk (600) that can be used with the electrodes (500) to create the stack. The insulator disk has uniform, flat surface (605) and is made of insulating material with a constant thickness. FIGS. 8B and 8C depict a perspective view and cross-sectional view of a preferred embodiment of an insulator disk (610). In this embodiment, the insulator disk (610) includes a raised area (615), a recessed area (620) and raised contact areas (625). The central hub (605) of a given insulator disk is positioned in contact with a corresponding central hub (505) of the electrode shown in FIGS. 7B and 7C to create a precise gap (spacing) and alignment between the electrode and adjacent electrodes. The raised ridges (530) around the central hub of the electrodes constrain any lateral movement of the insulator disks and keep them in snug contact and alignment with the corresponding electrodes in the stack. It is noted that it is possible to use a glue to maintain the alignment of electrodes and insulators in the stack. In this case, the stack must be compressed during the gluing operation to ensure that the spark gap dimensions are maintained. It is important that the application of the glue be uniform in terms of the thickness of the glue line to ensure that all gaps have the same dimensions.

Returning to FIG. 6, the stack (405) is kept in a compressed state using a spring or similar structure. In some embodiments a Wavespring (415) applies a compressive force via a pressure plate (410) to the electrode/insulator stack (405). The stack is enclosed (surrounded by) an insulating body (715), which is also shown in FIGS. 10A-10C. The S3G stack (405) and body (715) are mounted between first and second end flanges (420), (425). The upper and lower flanges (420), (425) are designed to have minimal inductance consistent with the current handling requirements of the gap. It is not unusual for gaps of this type to have to pass thousands of Amperes of current during a single event, but only for very brief periods of time. The embodiment shown in FIGS. 9A, 9B and 9C includes bus bar mounting bolt holes (730) for electrical connections that are configured to be consistent with the NEMA 2 bus bar mounting bolt hole configuration (National Electrical Manufacturers Association; 2-hole connection standard). It is noted that there are many alternative connecting schemes and the aforementioned is only one typically encountered.

Figure 1:
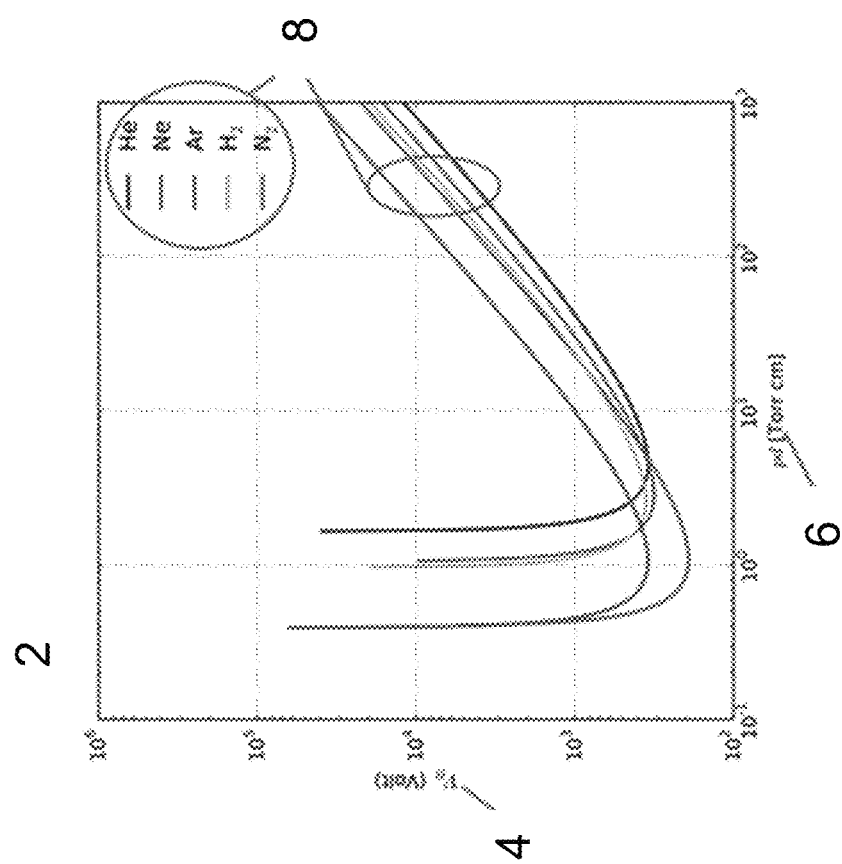
FIG. 1 is a graphic description of Paschen's Law. This graph shows the results of the calculation for several different gasses (Helium, Neon, Argon, Hydrogen, and Nitrogen). Each gas has its specific use which is determined by the application and location of the spark gap.

Referring again to FIG. 6, O-rings (450) are installed in grooves machined into the upper and lower flanges (420), (425) to provide a pressure seal for the inner working area of the insulating body (715). The insulating body (715) is pressurized via a gas inlet port (430) with a gas chosen during the Paschen's Law analysis (Equation 1). It is noted that a preferred embodiment would use hermetic seals instead of o-rings for long life, but either will work. Other sealing methods appropriate to the desired operating pressure may also be used. FIG. 1 shows a graph of breakdown voltage as a function of pressure for selected gases. As indicated shown in FIG. 1, different gases have different responses and insulating properties. The optimal gas and its operating pressure is chosen on the basis of the operating voltage. The port is then sealed by known means and the S3G is ready for installation and operation. The static series spark gap apparatus (400) further includes retaining screws (435), holes (440) for mounting and electrical connection, and a connection strap (445) that couple the uppermost electrode to the upper flange (420). In some embodiments, a second gas port (455) (not shown) is provided should additional control of the internal gas pressurization be desired. In some embodiments, an additional connection strap (not shown) is used to couple the lowermost electrode to the lower flange (425). It is noted that applicable electrical codes, regulations and design rules regarding cross-sectional area of a conductor with regard to its current carrying capacity must be adhered to in the design of the present invention, particularly connecting straps (445), the gap electrodes (500), upper flange (420) and lower flange (425).

The preferred embodiment as shown in FIGS. 9A-C is designed for indoor use only. To make it compatible for outdoor use, it is necessary to add "sheds", also known as "flutes" or "skirts". Such sheds comprise ridges on the exterior surface of an insulator which increase the tracking distance and allow high voltage devices to be used outdoors in wet and dirty weather and environmental conditions.

Figure 10:
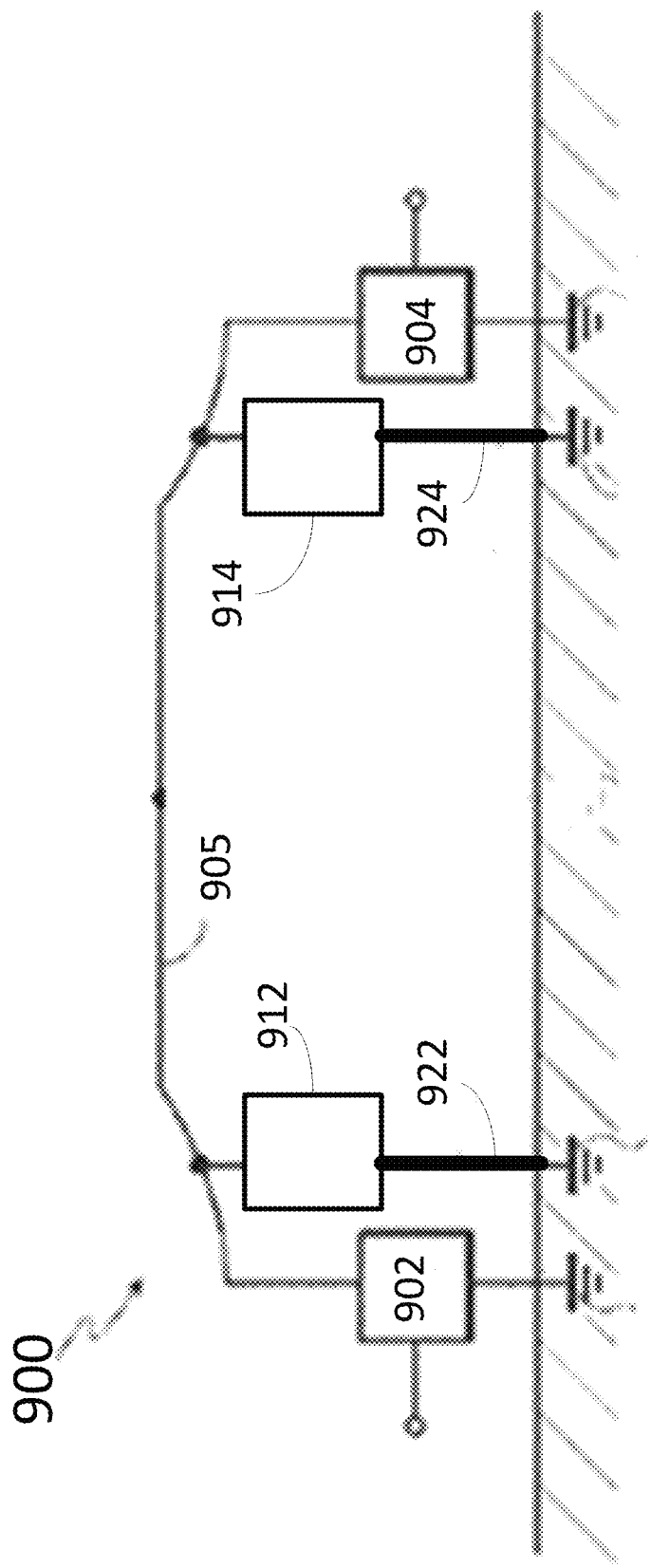
FIG. 10 is a schematic illustration of an electrical power transmission system that employs a series static spark gap (912) in a shunt arrangement to protect the system from hazardous EMI.

FIG. 10 schematically illustrates a typical electric power transmission system in which series static spark gaps as described above are used as shunt switches to protect the system from the effects of hazardous EMI. In the electrical power transmission system (900), a first large transformer (902) is connected between a first end of a transmission line (905) and ground. At the other end of the transmission line, a second large transformer (904) is connected between the transmission line (905) and ground. At a first end of the transmission line (905), a first series static spark gap (912) is connected between the transmission line (905) and ground via a first low impedance conductor (922), in parallel with the first transformer (902). At the second end of the transmission line (905), in parallel with the second transformer (904), a second series static spark gap (914) is connected between the transmission line and ground via a second low impedance conductor (924) also in parallel with the second transformer (904).

The low impedance conductors (922), (924) can comprise a wide, planar conductive strap which provides a low-inductance, low-impedance path to ground for shunting the current of the EM pulse. The conductive strap can be implemented using a copper band as one possible example. The relative dimensions of the conductive strap in term of length, width and thickness determine the inductance of the strap, which in turn determines the impedance of the strap to the eliminating high speed transient voltages induced by the EMP since the impedance (or reactance) of an inductor is proportional to its inductance. A conductor with a high inductance will fail to shunt the high speed transient voltages quickly enough and will also be subject to electromagnetic reflections. The ratio between the width of the strap to its thickness is an important factor in determining the inductance and impedance of the strap. Generally, the strap is constructed so that its width is greater than twice the value of its thickness to ensure low inductance and impedance. See "Electromagnetic Compatibility Handbook" by Kenneth Kaiser, CRC Press 2005; 15.9. In some embodiments, the width of the strap 140 is greater than twice its thickness. In certain embodiments, the width of the strap is between 5 and 10 times its thickness, and in further embodiments, the width of the strap is greater than 10 times its thickness. It is noted that a round wire ground connection can be used although at the reduction of the efficiency of the ground connection performance due to the relatively high inductance of a round wire compared to a flat strap.

A known disadvantage of prior art series static spark gap designs is that the voltage distribution is uneven across the stack. When handling high voltages and very large currents. This is a disadvantage as there is significant wear on the electrodes closest to the voltage source. Further, the build-up of voltage causes deposition of electrode material as a result of the extreme heat of the arc which is in the thousands of degrees Centigrade range, dependent on voltage. This deposited metal compromises the integrity of the insulator.

Figure 11:
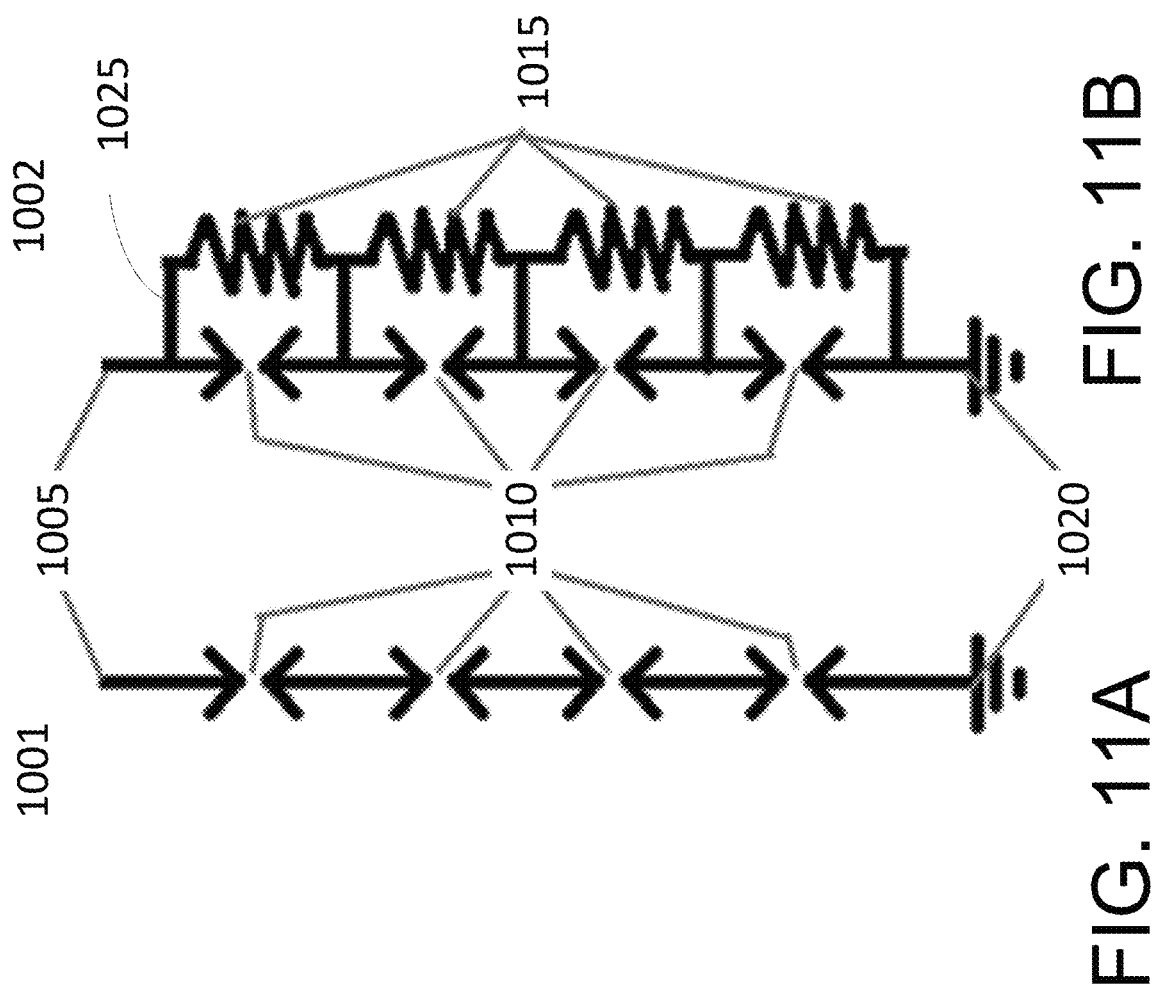
FIGS. 11A and 11B are schematic illustrations of the principle of operation of the Series Spark Gap without (11A) and with (11B), the improved voltage divider.

The present invention provides several specific improvements to the S3G design. A first improvement regards the use of a high-impedance resistor network in parallel with the spark gap element in the S3G apparatus. FIGS. 11A (basic S3G stack) and 11B (improved S3G stack) show schematic diagrams showing S3G circuits without (1001) and with (1002) a resistor divider network. In both, an input voltage (1005) is applied to both circuits at one end, with ground (1020) at the other end. In both circuits (1001), (1002) a series of gap elements (1010) is positioned between the input voltage and ground. In the second circuit (1002) a resistor network (1015) is positioned in parallel with the spark gap elements (1110). The nodes of the resistor network (1015) are coupled via connections (e.g., 1025) to the terminals of the gaps in the spark gap elements. The resistor values of the network are chosen to have a very high impedance so that there is minimal current flow when the gaps are not conducting. This value would typically be many MegOhms to get the current into the low milliAmpere or microAmpere range. Further, the resistors are preferably high tolerance high voltage low inductance metal film type with a typical tolerance of 5% or better.

Figure 12:
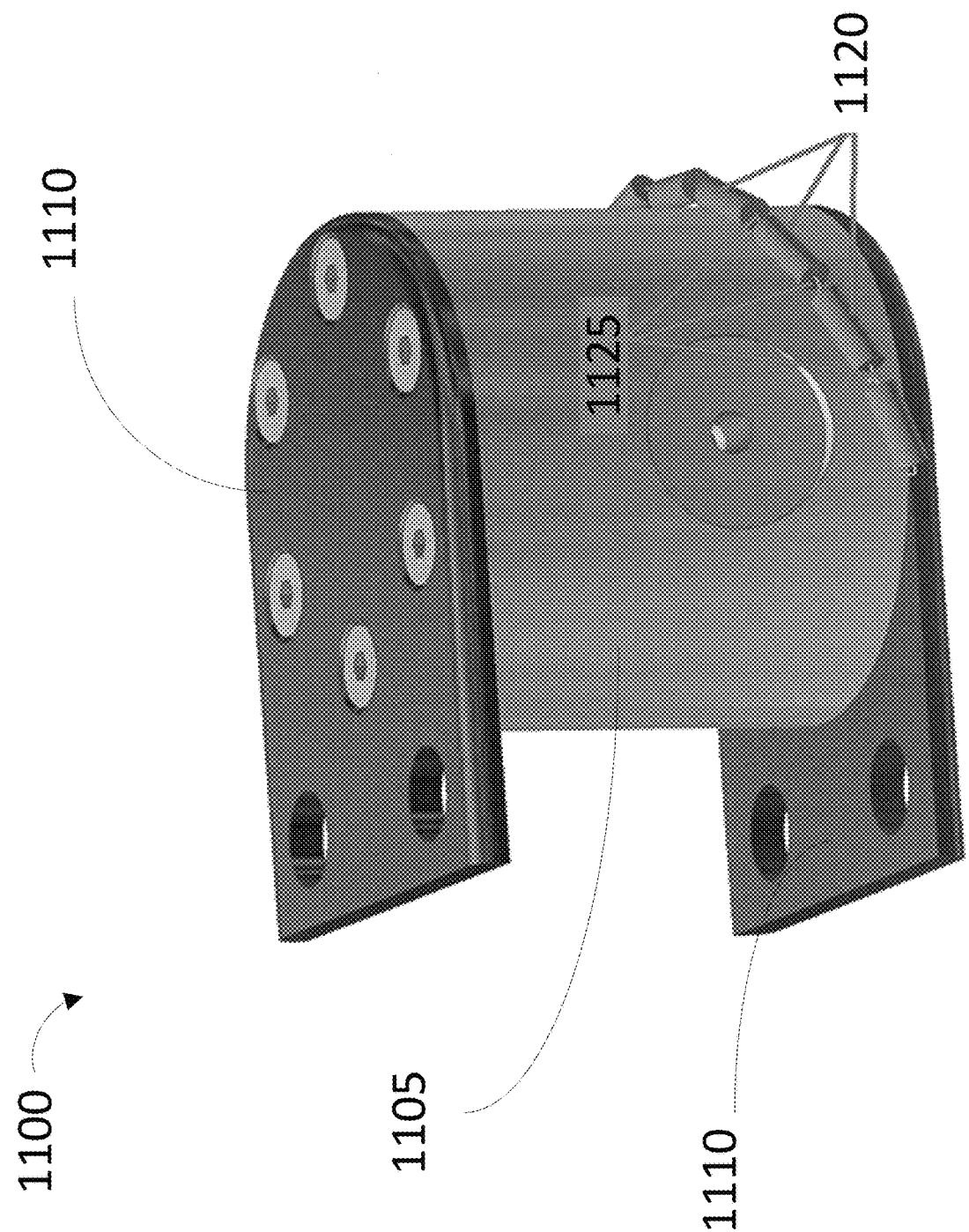
FIG. 12 shows a perspective view of an embodiment of the improved series static spark gap of FIG. 11B according to the present invention.

An embodiment of the S3G apparatus according to the present invention that includes a parallel resistor network is shown in FIG. 12. As shown, the design is similar to that shown in FIG. 9A, with the S3G apparatus 1100 including an insulating body 1105 positioned between upper and lower flanges (1110), (1115). Within the insulating body (and not shown in FIG. 12), there is a stack of alternating electrode and insulator disk elements, similar to element 405 in FIG. 6, and incorporating the electrodes and insulators of FIGS. 7 & 8. A resistor network (1120) (voltage divider) is positioned surrounding the insulating body, with the resistors of the network starting at the lower flange (1110) and moving up toward the upper flange. Each resistor is coupled to the one or more adjacent resistors via a coupling conductive wire. A separate coupling wire element (1125) connects the conductive wire between the adjacent resistors to the electrode elements (not shown) within the S3G apparatus. This arrangement allows the voltage drop across at each of the electrodes (spark elements) to be more precisely regulated. The coupling wire element (1125) enters the insulating body through a hermetic seal using methods well known to those of ordinary skill in the art.

Another improvement regards the insulator elements of the S3G apparatus. The insulator disk (600), (610), must be made from materials with a sufficiently high dielectric strength that they will withstand, typically, twice the voltage that will be normally applied to them, as well as being thermally stable at high temperatures due to their close proximity to the electrical arcs formed in the gaps. Suitable materials for the basic insulator disk are mica, fused silica (quartz), and glass. Plastics should be avoided as they will degrade over time due to exposure to the arc and when they do, they carbonize which makes the disk surface conductive, rendering the insulator useless. The advanced insulator design should be made from preferably pressed fused silica or alternatively cast or pressed high alumina ceramic.

A third improvement is the inclusion of a "hub" on the central regions of the insulator to engage a matching depression (510) in the electrodes (500) and pressure plate (415) adjacent to the insulator (600), said hub being preferably formed by pressing or machining. The purpose of this structure is to force alignment of the electrodes (500), the insulators (600), the pressure plate (410), wavespring (415), and upper and lower flanges (420), (425). As is the case above, the advanced insulator design should be made from preferably pressed fused silica or alternatively cast or pressed high alumina ceramic.

It is noted that the choice of the insulating body material is primarily dependent on the gas and its operating pressure. For gasses like nitrogen and argon, a plastic body can be used. If hydrogen is chosen, then either a glass or ceramic insulating body should be used due to the fact that hydrogen is very difficult to contain in any container other than one which is hermetically sealed and helium leak checked. The operating pressure also determines the insulating body material. If the S3G is going to be operated at atmospheric pressure or slightly above, and the gas is appropriate, then a plastic body is acceptable. If the S3G is going to be operated at pressures below atmospheric, then glass or ceramic is a better choice for long life.

It is important to note that the spark gaps of the current invention are significantly different from those typically and conventionally used to protect electrical power equipment from lightning. These gaps, usually known as "horn gaps" consist of a pair of curved rods in close proximity arranged to form a "Jacob's Ladder" (See FIG. 4B; elements 170,175. Jacob's Ladder is on the left side as two metal rods with an increasing spacing between them). This type of structure has a much slower risetime than the apparatus of the current invention and is not capable of reacting fast enough to be of any use in protecting against the picosecond or low nanosecond risetime pulses that typify EMP.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

S3G LIST OF DRAWING ELEMENTS

FIG. 1: 2: Paschen's Law Curves: Main
4: Voltage (Y axis)
6: Gap Pressure (X axis)
8: Various Gasses
FIGS. 2A and 2B: 10: Typical Electrical Transmission Line System before EMP
12: High Voltage Electrical Transmission Line
14a, 14b: Support towers
16: Input Power Transformer
18: Output Power Transformer
20: Electrical & Physical Ground
22: Incident EMP Waveform
24: Induced Circulating Voltage & Current
25: Induced Circulating Voltage & Current
FIG. 3: Conventional Electrical Transmission Line System with conventional EMP protection:
Electrical Schematic:
36: Electrical Grounding connection from Protective Device
37: Protective Device (high speed switch, electron tube, spark gap, S3G (current invention))
38: Electrical Grounding connection from Protective Device
39: Protective Device (high speed switch, electron tube, spark gap, S3G (current invention))
FIG. 4A: 100: Single Gap Spark Gap; Prior Art: Main
105: Spark Gap
110: Electrode Holder
115: Tungsten Electrodes
FIG. 4B: 150: Horn Type Spark Gap
155: Insulator
160: Mounting Bolt & Nut
165: Mounting Frame
170: Upper Horn Electrode
175: Lower Horn Electrode
180: Electrode Mounting Clamp
185: "Sheds" (aka "flutes" or "skirts")
FIG. 5A, 5B: 100: Tesla S3G: Prior Art: Main
205: Insulated support rail
210: Threaded Rod; Conductive
215: Retaining Nut; conductive
220: Bushing; conductive 225: Gap electrode
230: Tie Rod & Nut; conductive
FIG. 6: 400: Current Invention: Generic: Cutaway: Main
405: Series Stack of Spark Gap Elements under spring and pressure plate
410: Wave Spring: between upper flange and pressure plate
415: Pressure Plate
420: Upper Flange
425: Lower Flange
430: Pressurizing Gas Port (has internal NPT thread)
435: Retaining Screws
440: Mounting & Electrical Connection Holes
445: Connection Strap or Braid
450: O-ring (in groove, 2 places)
455: Second Gas Port (not shown)
500: Gap Electrode
FIG. 7A: Electrode (first embodiment)
500: Gap Electrode
505: Central Hub
510: Depressed surrounding Area
515: Radiused Contact Area
FIGS. 7B, 7C: Electrode (second embodiment)
520: Gap Electrode
525: Central Hub
530: Ridge around Central Hub
535: Depressed Surrounding Area
540: Radiused Contact Area
FIG. 8A: Insulator disk 600 (first embodiment)
605: Surface of insulator disk
FIGS. 8B, 8C: Insulator disk 610 (second embodiment)
615: Central raised area
620: recessed area
625: raised flange
FIG. 9A, 9B: 700: S3G Preferred Embodiment: Main
420: Upper Flange with NEMA 2 Connection Hole pattern
435: Retaining Screws (see 435)
715: Insulating Body
430: Pressurizing Gas Port (see 430)
425: Lower Flange with NEMA 2 Connection Hole pattern
730: NEMA 2 Connecting Bolt Hole Pattern
FIG. 10 Electrical transmission system with S3G apparatus according to present invention (900).
902: Input Power Transformer
904: Output Power Transformer
905: High Voltage Electrical Transmission Line
912: S3G apparatus according to the present invention coupled in shunt with input power transformer
914: S3G apparatus according to the present invention coupled in shunt with output power transformer
922: First-low-impedance path from S3G apparatus to ground
924: Second-low-impedance path from S3G apparatus to ground
FIGS. 11A, 11B Schematics of S3G apparatus of present Invention with and without Resistive Divider Added
1001: S3G apparatus without resistive divider
1002: S3G apparatus with resistive divider
1005: Voltage input
1010: Spark gap elements
1015: Voltage Divider Resistors
1020: Voltage output/or ground
1025: Connection between resistors and electrode
FIG. 12: 1100: Perspective view of S3G apparatus according to the present invention with resistor dividers
1105: Insulating Body
1110: Upper Flange
1115: Lower Flange
1120: Resistors of divider circuit
1125: Connection between resistors and electrode

What is claimed is:

1. A method of protecting an electrical transmission system having an electrical transmission line coupled to electrical equipment from hazardous EMI comprising:
receiving at least one pulse of hazardous EMI on the transmission line; and
shunting the at least one pulse of hazardous EMI to ground through at least one static series spark gap apparatus in such manner as to bypass high speed transient voltages away from the electrical equipment to ground via a low impedance path and preventing damage thereto;
wherein the static series spark gap apparatus has a rise time that is substantially 2 nanoseconds or less, the at least one static series spark gap apparatus comprises an insulating body including a stack of alternating electrodes and insulator disks that is filled with a pressurized gas, and the insulator disks of the stack have peripheral ridges that are adapted increase an electrical path length and prevent conductive film formation.

2. A method of protecting an electrical transmission system having an electrical transmission line coupled to electrical equipment from hazardous EMI comprising:
receiving at least one pulse of hazardous EMI on the transmission line; and
shunting the at least one pulse of hazardous EMI to ground through at least one static series spark gap apparatus in such manner as to bypass high speed transient voltages away from the electrical equipment to ground via a low impedance path and preventing damage thereto;
wherein the static series spark gap apparatus has a rise time that is substantially 2 nanoseconds or less, the at least one static series spark gap apparatus comprises an insulating body including a stack of alternating electrodes and insulator disks that is filled with a pressurized gas, and the electrodes include a depressed section and the insulating disks include a raised hub section that match the depressed sections of the electrodes so as to ensure and maintain an alignment of the electrodes and the insulator disks in the stack.

3. An electrical transmission system protected against hazardous EMI comprising:
an electrical transmission line;
first electrical equipment coupled between the electrical transmission line and ground at a first location;
second electrical equipment coupled between the electrical transmission line and ground at a second location;
a first series static spark gap apparatus coupled between the electrical transmission line and ground at the first location, in parallel with the first electrical equipment; and
a second series static spark gap apparatus coupled between the electrical transmission line and ground at the second location, in parallel with the second electrical equipment;
wherein the first and second series spark gaps are operative to shunt pulses of hazardous EMI to ground in such manner as to protect the first and second electrical equipment from damage, the first and second static series spark gap apparatus comprise an insulating body including a stack of alternating electrodes and insulator disks and a spring positioned so as to apply compressive force to the alternating electrodes an insulator disks, the insulating body being filled with a pressurized gas and the insulator disks of the stacks of the first and second series static spark gap apparatus have peripheral ridges that are adapted increase an electrical path length and prevent film formation.

4. An electrical transmission system protected against hazardous EMI comprising:
an electrical transmission line;
first electrical equipment coupled between the electrical transmission line and ground at a first location;
second electrical equipment coupled between the electrical transmission line and ground at a second location;
a first series static spark gap apparatus coupled between the electrical transmission line and ground at the first location, in parallel with the first electrical equipment; and
a second series static spark gap apparatus coupled between the electrical transmission line and ground at the second location, in parallel with the second electrical equipment;
wherein the first and second series spark gaps are operative to shunt pulses of hazardous EMI to ground in such manner as to protect the first and second electrical equipment from damage, the first and second static series spark gap apparatus comprise an insulating body including a stack of alternating electrodes and insulator disks and a spring positioned so as to apply compressive force to the alternating electrodes an insulator disks, the insulating body being filled with a pressurized gas and the electrodes of the first and second series static spark gap apparatus include a depressed section and the insulating disks of the first and second series static spark gap apparatus include a raised hub section that match the depressed sections of the electrodes so as to ensure and maintain an alignment of the electrodes and the insulator disks in the stack.

5. A series static spark gap apparatus adapted to protect electrical systems from hazardous electromagnetic interference (EMI) comprising:
an insulating body;
a stack positioned within the insulating body including a plurality of alternating electrode and insulator disk elements;
a spring coupled to the insulating body adapted to apply compressive pressure to the stack;
a sealable port for receiving a pressurized gas into the insulating body; and
a fixed voltage divider network coupled across the electrodes of the stack.

6. A series static spark gap apparatus adapted to protect electrical systems from hazardous electromagnetic interference (EMI) comprising:
an insulating body;
a stack positioned within the insulating body including a plurality of alternating electrode and insulator disk elements;
a spring coupled to the insulating body adapted to apply compressive pressure to the stack; and
a sealable port for receiving a pressurized gas into the insulating body,
wherein the insulator disks of the stack have peripheral ridges that are adapted increase an electrical path length and inhibit film formation.

7. A series static spark gap apparatus adapted to protect electrical systems from hazardous electromagnetic interference (EMI) comprising:
an insulating body;
a stack positioned within the insulating body including a plurality of alternating electrode and insulator disk elements;
a spring coupled to the insulating body adapted to apply compressive pressure to the stack; and
a sealable port for receiving a pressurized gas into the insulating body,
wherein the electrodes of the stack include a depressed section and the insulator disks include a raised hub section that matches the depressed section of the electrodes so as to ensure and maintain an alignment of the electrodes and the insulator disks in the stack.

8. A series static spark gap apparatus adapted to protect electrical systems from hazardous electromagnetic interference (EMI) comprising:
an insulating body;
a stack positioned within the insulating body including a plurality of alternating electrode and insulator disk elements;
a spring coupled to the insulating body adapted to apply compressive pressure to the stack; and
a sealable port for receiving a pressurized gas into the insulating body;
first and second flanges positioned at respective ends of the insulating body on either side of the stack of electrodes and insulator disks, the flanges adapted to be coupled to an electrical transmission line of an electrical power transmission system; and
a conductive strap or braid coupling the first flange to a first end electrode of the stack of electrodes and insulator disks.

9. The series static spark gap of claim 8, further comprising a second conductive strap of braid coupling a second end electrode, opposite to the first end electrode, of the stack of electrodes and insulator disks to the second flange.

10. A method of protecting an electrical transmission system having an electrical transmission line coupled to electrical equipment from hazardous EMI comprising:
receiving at least one pulse of hazardous EMI on the transmission line; and
shunting the at least one pulse of hazardous EMI to ground through at least one static series spark gap apparatus in such manner as to bypass high speed transient voltages away from the electrical equipment to ground via a low impedance path and preventing damage thereto;
wherein the at least one static series spark gap apparatus comprises an insulating body including a stack of alternating electrodes and insulator disks that are in direct contact without air gaps and that is filled with a pressurized gas and the static series spark gap apparatus has a rise time that is substantially 2 nanoseconds or less.

11. The method of claim 3, further comprising compressing the stack of alternating electrodes and insulator disks using a spring.

12. The method of claim 3, wherein the at least one static series spark gap apparatus further includes a fixed voltage divider network coupled across the electrodes of the stack.

13. The method of claim 10, further comprising coupling the stack of alternating electrodes and insulator disks via a low inductance conductive strap or braid to a flange that is coupled to the electrical transmission line.

14. An electrical transmission system protected against hazardous EMI comprising:
an electrical transmission line;
first electrical equipment coupled between the electrical transmission line and ground at a first location;
second electrical equipment coupled between the electrical transmission line and ground at a second location;

a first series static spark gap apparatus coupled between the electrical transmission line and ground at the first location, in parallel with the first electrical equipment; and a second series static spark gap apparatus coupled between the electrical transmission line and ground at the second location, in parallel with the second electrical equipment;

wherein the first and second series spark gaps are operative to shunt pulses of hazardous EMI to ground in such manner as to protect the first and second electrical equipment from damage, the first and second static series spark gap apparatus comprise an insulating body including a stack of alternating electrodes and insulator disks that are in direct contact without air gaps and a spring positioned so as to apply compressive force to the alternating electrodes an insulator disks, the insulating body being filled with a pressurized gas.

15. The system of claim 8, wherein the first and second static series spark gap apparatus further include a voltage divider network coupled across the electrodes of their respective stacks.

16. The method of claim 8, further comprising compressing the stack of alternating electrodes and insulator disks using the spring.

* * * * *